United States Patent
Nakajima et al.

(10) Patent No.: US 6,894,682 B2
(45) Date of Patent: May 17, 2005

(54) CONNECTION STRUCTURE FOR CONNECTING BETWEEN TOUCH PANEL AND EXTERNAL CONDUCTOR

(75) Inventors: Takashi Nakajima, Shinagawa (JP); Mitsuaki Nakazawa, Shinagawa (JP); Kazuyuki Yoshifusa, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 258 days.

(21) Appl. No.: 10/373,733

(22) Filed: Feb. 27, 2003

(65) Prior Publication Data

US 2003/0184526 A1 Oct. 2, 2003

(30) Foreign Application Priority Data

Mar. 27, 2002 (JP) ........................................ 2002-089264

(51) Int. Cl.[7] .................................................. G09G 5/00
(52) U.S. Cl. ................. 345/173; 178/18.01; 178/18.03; 178/18.05; 178/18.08; 200/5 A; 200/512; 200/600; 156/51; 29/622; 29/825
(58) Field of Search ................................ 345/173, 174; 178/18.01–18.08; 200/5 A, 512, 60; 156/51; 29/622, 825; 520/1

(56) References Cited

U.S. PATENT DOCUMENTS

| | | | |
|---|---|---|---|
| 6,529,188 B1 * | 3/2003 | Suzuki ........................ 345/173 |
| 6,552,718 B2 * | 4/2003 | Ahn et al. ................... 345/173 |
| 6,587,097 B1 * | 7/2003 | Aufderheide et al. ....... 345/173 |
| 6,677,542 B2 * | 1/2004 | Katakami .................... 200/5 A |
| 6,784,875 B2 * | 8/2004 | Yuen ........................... 345/173 |
| 6,791,535 B2 * | 9/2004 | Suzuki ........................ 345/173 |
| 2002/0000979 A1 * | 1/2002 | Furuhashi et al. .......... 345/173 |

FOREIGN PATENT DOCUMENTS

JP          11-97088          4/1999

* cited by examiner

Primary Examiner—Henry N. Tran
(74) Attorney, Agent, or Firm—Staas & Halsey LLP

(57) ABSTRACT

Improves the connection between a touch panel and an external harness.

A first electrode cable (11) and a third electrode cable (13) are disposed on a first ITO film (20) on a glass substrate (10) of a touch panel, and a second electrode cable (12) and a fourth electrode cable (14) are disposed on a second ITO film (60) on a flexible resin (50). First to fourth guide conductors (31 to 34) are disposed in parallel on a first insulation layer (30) that is provided near a first side (10$a$) of the glass substrate. The first to fourth electrode cables are connected to the first to fourth guide conductors, via first to fourth connection conductors (21 to 24). A second insulation layer (40) is laminated on them. On a connection section (6) of an external harness (4), first to fourth external conductors (81 to 84) have their coating removed at the touch panel side, and are superimposed with the plurality of guide conductors of the touch panel so that they cross each other. First to fourth holes (41 to 44) are provided in advance on the second insulation layer at positions where the external conductors cross the guide conductors respectively. The external harness and the touch panel are pressed together while being heated, and are connected together.

7 Claims, 7 Drawing Sheets

CONNECTION STRUCTURE FOR CONNECTING BETWEEN TOUCH PANEL AND EXTERNAL CONDUCTOR

BACKGROUND OF THE INVENTION

1. Field of the Invention

The present invention relates to a touch panel and, more particularly, relates to a connection between a touch panel and a cable.

2. Description of the Related Art

In recent years, along with the expansion of the market for business terminals such as information communication terminals like PDAs and automatic ticketing machines, the demand for touch panels that can easily detect XY coordinates has been expanded rapidly.

This touch panel has usually two square plate members disposed by sandwiching spacers between them, with at least one plate member having flexibility. Electrode cables are disposed along two mutually opposite sides of one of the plate members. Electrode cables are also disposed along two mutually opposite sides of the other plate member. These electrode cables are extended to a guide conductor provided on one side, and this guide conductor is connected to an external harness.

The sizes of the touch panel are different depending on the sizes of a display unit like an LCD used. When touch panels have the same sizes and also when guide conductors are connected to the external harnesses respectively, their connection positions may be different. Conventionally, as shown in Japanese Patent Application Laid-open Publication No. 8-203382, one guide conductor is prepared using one part, and even when a position is slightly different, it is necessary to prepare a separate guide conductor. Therefore, there has been a waste, and improvement has been desired.

Further, as external force is repeatedly applied to the panel, improvement in the durability of the connection part between the panel and the external harness has also been required.

SUMMARY OF THE INVENTION

In the light of the above problems, it is an object of the present invention to provide a connection structure for connecting between a touch panel and a cable that can be easily applied to connection parts having different requirements.

It is another object of the present invention to provide a connection structure having high durability.

In order to achieve the above objects, according to one aspect of the present invention, there is provided a connection structure for connecting a plurality of electrode cables of a touch panel to a plurality of corresponding external conductors of an external harness, the touch panel being provided such that two plates, with at least one plate having flexibility, are disposed by sandwiching spacers between them, electrode cables being disposed along two mutually opposite sides of one plate, and electrode cables being disposed along two mutually opposite sides of the other plate that are approximately orthogonal with the two sides, wherein a plurality of guide conductors connected respectively to the electrode cables are disposed in parallel while being mutually insulated, on one surface of one plate of the touch panel to extend along one side in the vicinity of this side, the external harness is formed in a flat cable that has the plurality of external conductors laid out in parallel with each other and integrally coated with an insulating resin at top and bottom surfaces, on the same plane, the plurality of external conductors are superimposed with the plurality of guide conductors of the touch panel so that they cross each other, the insulating material on mutually opposite sides of portions at which the plurality of guide conductors of the touch panel and the corresponding external conductors cross each other is removed in advance, and at the cross portions, the touch panel and one side of the external harness are pressed against the other side while being heated, thereby to connect the plurality of guide conductors of the touch panel with the corresponding external conductors.

Based on the above connection structure, it is possible to fit the external conductor to optional positions on the guide conductors that are connected to the electrode cables of the touch panel. Therefore, it is possible to flexibly manage requests for changing the fitting positions of the external conductors.

According to another aspect of the invention, the plurality of external conductors have their coating on the surface opposing to the touch panel in the area superimposed to the touch panel removed for a predetermined length including respective cross portions.

According to still another aspect of the invention, the touch panel and one side of the external harness are pressed against the other side while being heated, thereby to connect the touch panel with the external harness, at points other than the cross points at which the plurality of guide conductors of the touch panel cross the corresponding external conductors of the external harness.

It is preferable that the touch panel is connected with the external harness at an outside position in a width direction of the external harness from the cross points at which the plurality of guide conductors of the touch panel cross the corresponding external conductors of the external harness.

It is further preferable that the touch panel is connected with the external harness at a position close to the touch panel from the cross points at which the plurality of guide conductors of the touch panel cross the corresponding external conductors of the external harness.

According to still another aspect of the present invention, there is provided a connection structure for connecting a plurality of electrode cables of a touch panel to a plurality of corresponding external conductors of an external harness, the touch panel being provided such that two plates, with at least one plate having flexibility, are disposed by sandwiching spacers between them, electrode cables being disposed along two mutually opposite sides of one plate, and electrode cables being disposed along two mutually opposite sides of the other plate that are approximately orthogonal with the two sides, wherein the external harness has its external conductors coated with an insulating resin at top and bottom surfaces to the front end, at an end portion of a connection with the touch panel, and is connected to auxiliary external conductors provided at the outside of the insulating resin with through-hole conductors that pass through through-holes provided at the outside of a touch panel area, and the auxiliary external conductors are extended to the touch panel area and connected to guide conductors that are connected to the electrode cables of the touch panel.

According to the above connection structure, the external harness has through-hole conductors, but are provided at the outside of the touch panel area. Therefore, the through-hole conductors are not damaged even when the external harness is pressed against the touch panel.

According to still another aspect of the present invention, there is provided a connection structure for connecting a plurality of electrode cables of a touch panel to a plurality of corresponding external conductors of an external harness, the touch panel being provided such that two plates, with at least one plate having flexibility, are disposed by sandwiching spacers between them, electrode cables being disposed along two mutually opposite sides of one plate, and electrode cables being disposed along two mutually opposite sides of the other plate that are approximately orthogonal with the two sides, wherein the connection structure has a fastening unit that mutually fastens the touch panel and the external harness, and the fastening unit includes a first plate member and a second plate member that is fixed to the first plate member with screws at the outside of a connection area, with one of the plate members being a spring member of which the center is projected to the outside, thereby to fasten the touch panel and the external harness together with elastic force of the spring member.

According to the above connection structure, the fastening unit fastens the touch panel and the external harness together. Therefore, the external harness is not easily removed.

The present invention may be more fully understood form the description of preferred embodiments of the invention set forth below, together with the accompanying drawings.

DETAILED DESCRIPTION OF THE PREFERRED EMBODIMENTS

Embodiments of a touch panel according to the present invention will be explained below with reference to the attached drawings.

Figure 1:
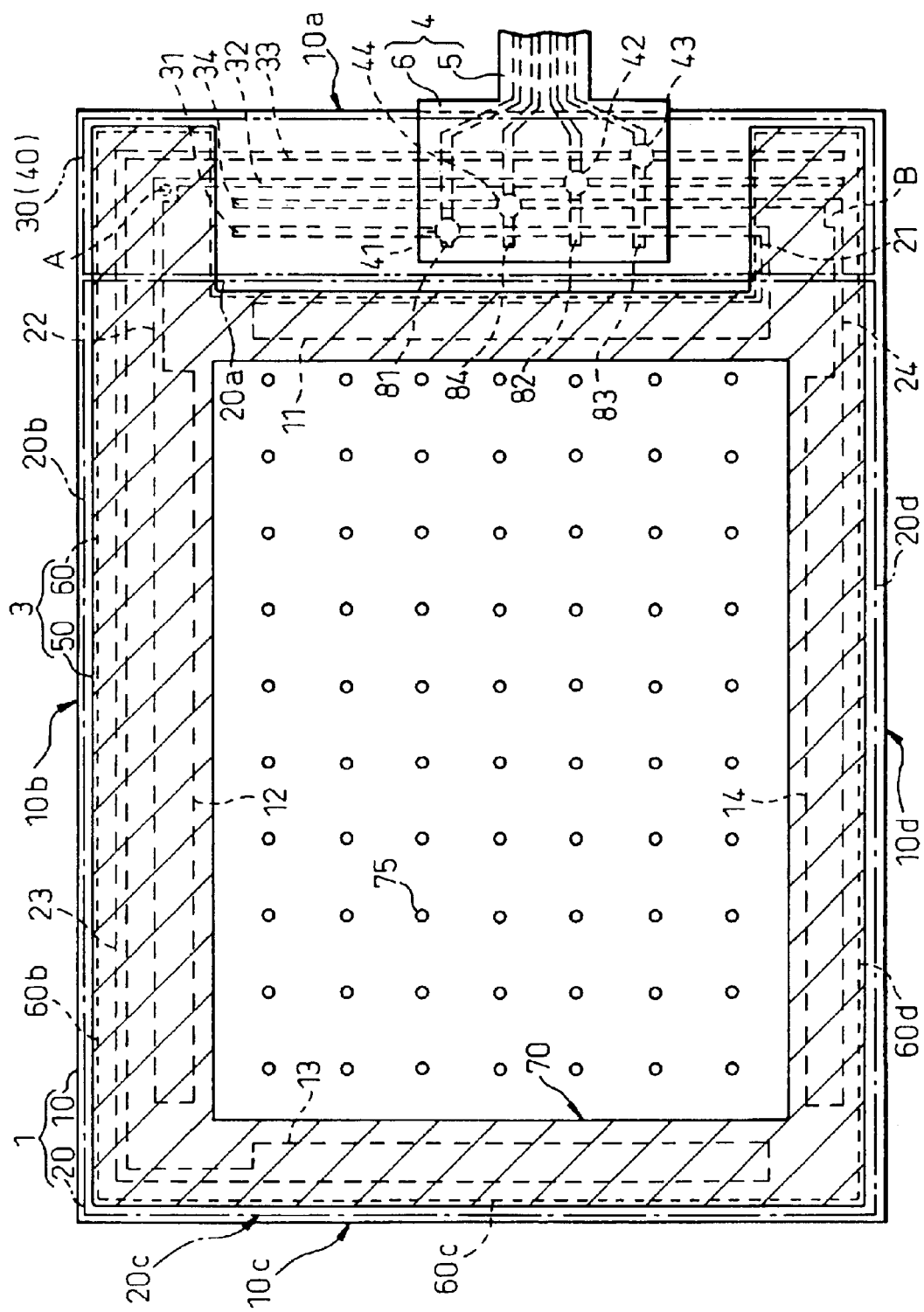
FIG. 1 is a view of a touch panel that explains a first embodiment.

A touch panel of a first embodiment will be explained first. FIG. 1 is a top plan view of the touch panel according to the first embodiment.

Figure 3:
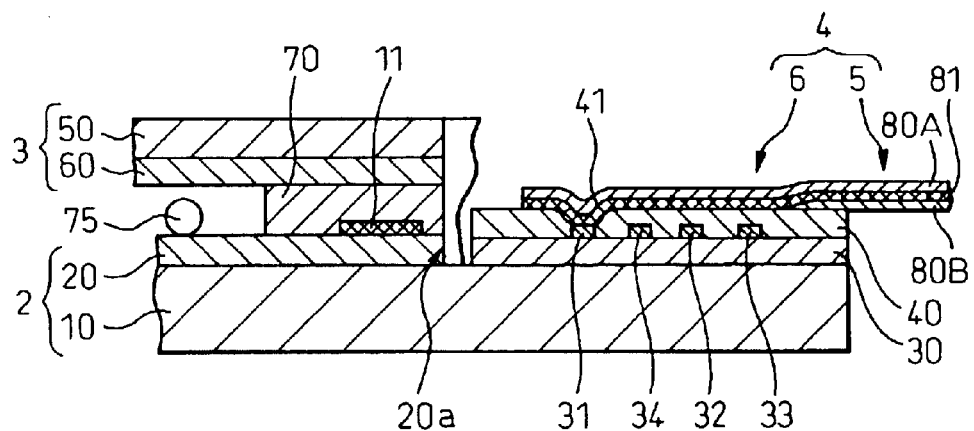
FIG. 3 is a cross-sectional view of the connection area cut along a line III—III in FIG. 2.

Referring to FIG. 1, there is a fixed-side member 2 that has a first ITO film 20 adhered onto a rectangular glass substrate 10 that has a first side 10a and a third side 10c in parallel with each other and a second side 10b and a fourth side 10d in parallel with each other, as indicated by a one-dot chain line (refer to FIG. 3).

A second side 20b, a third side 20c, and a fourth side 20d of the first ITO film 20 are located at positions where they coincide with the positions of the second side 10b, the third side 10c, and the fourth side 10d of the glass substrate 10 respectively. In the drawing, these positions are slightly deviated to facilitate the explanation. A first side 20a of the first ITO film 20 is located inside the glass substrate with a slight distance from the first side 10a of the glass substrate 10.

A first insulation layer 30 indicated by a two-dot chain line is provided on a portion of the glass substrate 10 along its first side 10a to which the first ITO film 20 is not adhered. On the first insulation layer 30, there are provided four guide conductors including a first guide conductor 31, a second guide conductor 32, a third guide conductor 33, and a fourth guide conductor 34, that extend in parallel with the first side 10a of the glass substrate 10 and are not in contact with each other. A second insulation layer 40 is laminated on the first insulation layer 30 and on the four guide conductors (refer to FIG. 3).

On the other hand, on the surface of the first ITO film 20, a first electrode cable 11 is provided to extend along the first side 20a at a position near the first side 20a. Further, on the surface of the first ITO film 20, a third electrode cable 13 is provided to extend along the third side 20c at a position near the third side 20c.

The first electrode cable 11 is connected to the first guide conductor 31 via a first connection conductor 21 that is provided on the first ITO film 20 and the first insulation layer 30. The third electrode cable 13 is connected to the third guide conductor 33 via a third connection conductor 23 that is provided on the first ITO film 20 and the first insulation layer 30.

Above (outside) the first ITO film 20, a movable-side member 3 (refer to FIG. 3) that has a second ITO film 60 adhered to a flexible resin 50 (refer to FIG. 3) is fitted to face the second ITO film 60 to the glass substrate 10 side, via a double-side adhesive tape 70 that is disposed in a hatched area.

On the surface of the second ITO film 60 of the movable-side member 3, a second electrode cable 12 is provided to extend along a second side 60b at a position near the second side 60b. Further, on the surface of the second ITO film 60, a fourth electrode cable 14 is provided to extend along a fourth side 60d at a position near the fourth side 60d.

The second electrode cable 12 is connected with a second connection conductor 22 that is provided on the second ITO film 60. The second connection conductor 22 pierces through the double-side adhesive tape 70 and the second insulation layer 40 at a point A, and is directed toward the first ITO film 20 and is connected to the second guide conductor 32. The fourth electrode cable 14 is connected with a fourth connection conductor 24 that is provided on the second ITO film 60. The fourth connection conductor 24 pierces through the double-side adhesive tape 70 and the second insulation layer 40 at a point B, and is directed toward the first ITO film 20 and is connected to the fourth guide conductor 34.

A number of dot spacers 75 made of an insulating material are disposed between the first ITO film 20 and the second ITO film 60 in the area surrounded by the inside sides of the double-side adhesive tape 70.

On the other hand, an external harness 4 connected to the touch panel 1 is made by sandwiching a first to fourth external conductor 81 to 84 by a base members 80A and 80B both are made by same resin. A connection section 6 of the external harness 4 is wider than the main portion 5 of the external harness. In the connecting section 6, except the portion near the of touch panel, base member 80B is eliminated. The connection section 6 of the external harness 4 having the above structure is disposed at a predetermined position such that the external conductors 81 to 84 are orthogonal with the guide conductors 31 to 34 provided on the touch panel 1, as shown in FIG. 1. A suitable tool is used to apply heat and to press each guide conductor and a corresponding external conductor together. In other words, a thermal compression is applied to a position where the first guide conductor 31 crosses the first external conductor 81, a position where the second guide conductor 32 crosses the second external conductor 82, a position where the third guide conductor 33 crosses the third external conductor 83, and a position where the fourth guide conductor 34 crosses the fourth external conductor 84, respectively.

In FIG. 1, at the position where the first guide conductor 31 crosses the first external conductor 81, a first hole 41 that pierces through the second insulation layer 40 is formed in advance on the second insulation layer 40 that covers the first guide conductor 31. At the position where the second guide conductor 32 crosses the second external conductor 82, a second hole 42 that pierces through the second insulation layer 40 is formed in advance on the second insulation layer 40 that covers the second guide conductor 32. At the position where the third guide conductor 33 crosses the third external conductor 83, a third hole 43 that pierces through the second insulation layer 40 is formed in advance on the second insulation layer 40 that covers the third guide conductor 33. Further, at the position where the fourth guide conductor 34 crosses the fourth external conductor 84, a fourth hole 44 that pierces through the second insulation layer 40 is formed in advance on the second insulation layer 40 that covers the fourth guide conductor 34.

Therefore, a conductive connection is realized between the first guide conductor 31 and the first external conductor 81, between the second guide conductor 32 and the second external conductor 82, between the third guide conductor 33 and the third external conductor 83, and between the fourth guide conductor 34 and the fourth external conductor 84, respectively.

The touch panel has the above structure in the first embodiment. In order to change the position of connecting the touch panel to the external harness 2, the first hole 41, the second hole 42, the third hole 43, and the fourth hole 44 are changed to match a desired position. With this arrangement, it is easy to change the connection position as desired.

Figure 2:
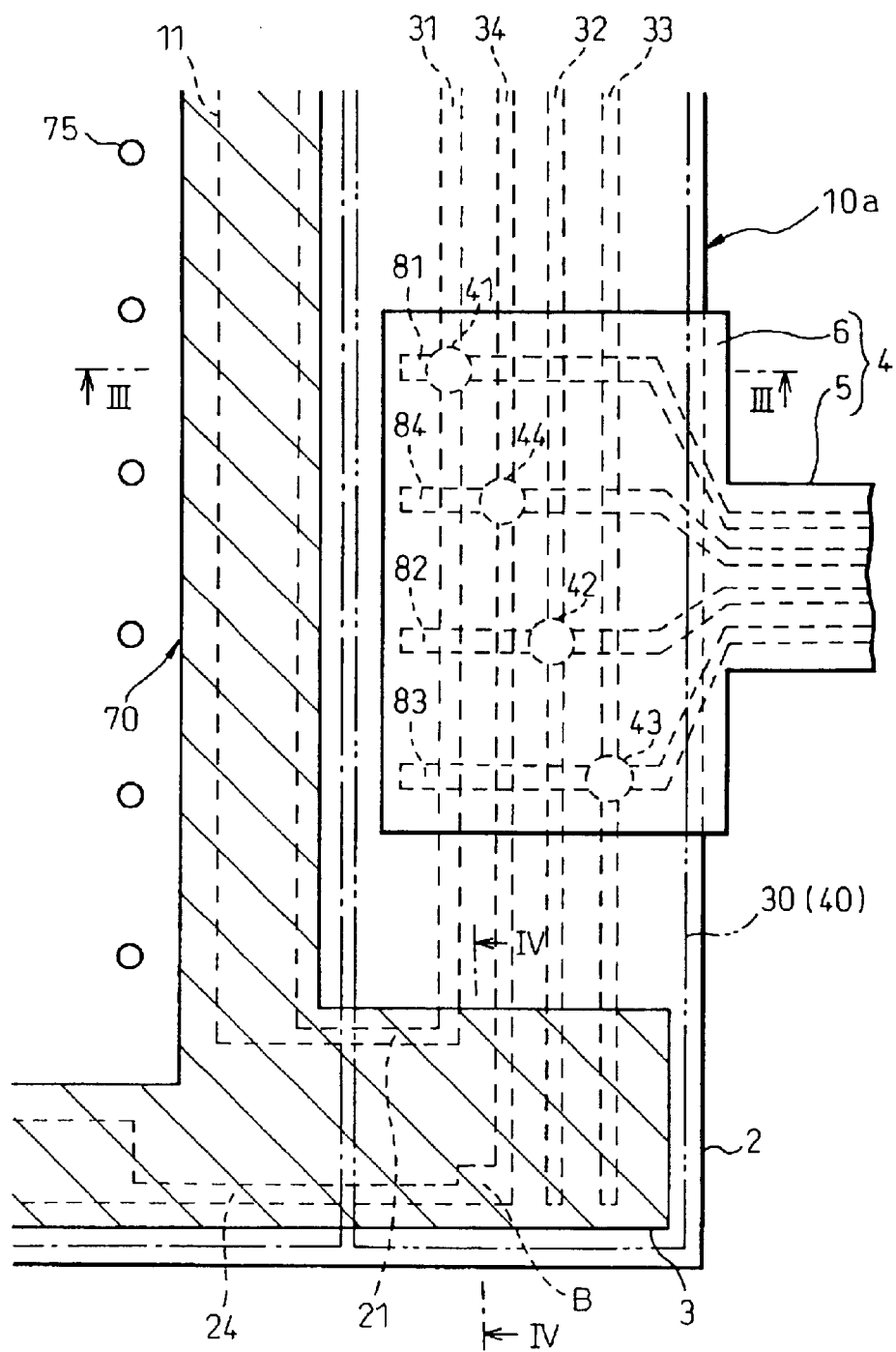
FIG. 2 is an enlarged view of a connection area between the touch panel and an external harness shown in FIG. 1.
Figure 4:
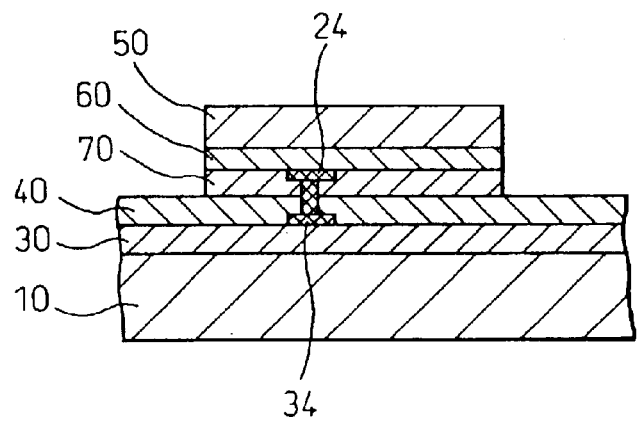
FIG. 4 is a cross-sectional view of the connection area cut along a line IV—IV in FIG. 2.

FIG. 2 is an enlarged view of a connection area between the touch panel 1 and the connection section 6 of the external harness 4 shown in FIG. 1. FIG. 3 is a cross-sectional view of the connection area cut along a line III—III in FIG. 2. FIG. 4 is a cross-sectional view of the connection area cut along a line IV—IV in FIG. 2.

Figure 5:
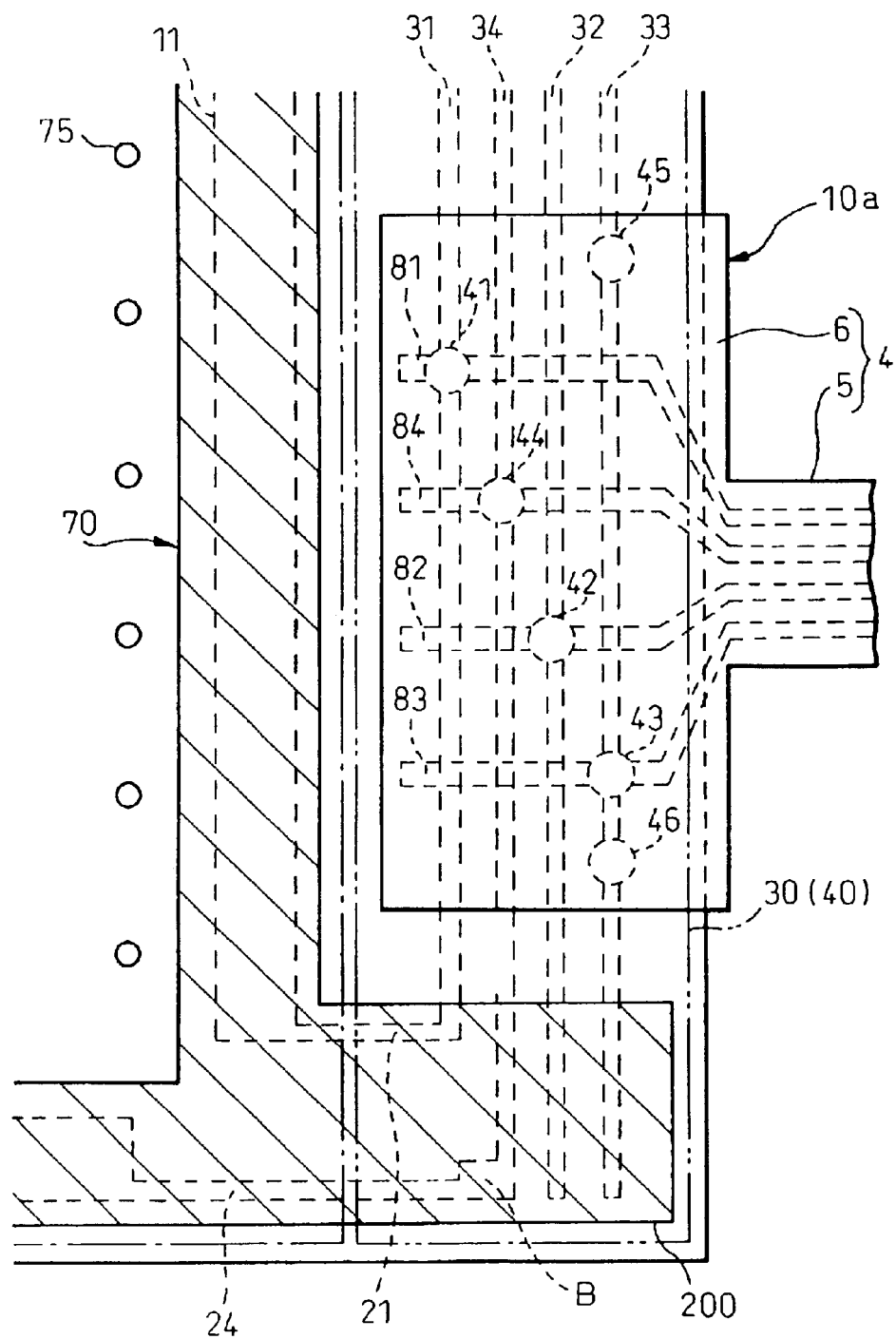
FIG. 5 is a view of a touch panel that explains a modification of the first embodiment.

FIG. 5 is a view of a touch panel that explains a modification of the first embodiment. In the first embodiment, the first hole 41, the second hole 42, the third hole 43, and the fourth hole 44 are provided to connect the first guide conductor 31, the second guide conductor 32, the third guide conductor 33, and the fourth guide conductor 34 to the first external conductor 81, the second external conductor 82, the third external conductor 83, and the fourth external conductor 84 respectively. In this modification, in addition to the above holes, a fifth hole 45 and a sixth hole 46 are additionally provided. The fifth hole 45 is provided in an area along the third guide conductor 33 nearest to the outside and at the outside in the width direction of the first external conductor 81 of the connection section 6 of the external harness 4. The sixth hole 46 is provided at the outside of the third external conductor 83 in the width direction. The base members 80A and 80B of the external harness 4 are thermally compressed on the third guide conductor 33. Based on this arrangement, the external harness 4 is not easily removed.

The fifth hole 45 and the sixth hole 46 may be compressed at positions near the first side 10a of the glass substrate 10, in place of the extension of the third guide conductor 33.

Next, a second embodiment of the present invention will be explained.

As explained above in the first embodiment, as the external harness is formed by sandwiching the external conductors between the base members, in order to connect the guide conductors of the touch panel 1 to the external conductors, it is necessary to guide the external conductors to the outside surface of the connection section 6.

In order to achieve this, the following structure is available. In the end area of the external harness that is connected with the touch panel, a through-hole is formed on the base member that is at the outside of the external conductor. A perpendicular conductor of which one end is connected to the external conductor is passed through the through-hole, and is extended to the outside surface of the base member. Based on this, the other end of this perpendicular conductor is connected to a connection external conductor that is provided at the outside of the base member.

Conventionally, a through-hole position, that is a position at which the perpendicular conductor is provided, has been a position at which the conductor is connected to the touch panel. However, this has had a problem that when the external conductor is pressed to connect it with the touch panel, this perpendicular conductor is disconnected. To avoid this problem, according to the second embodiment of the present invention, this through-hole is provided in an area where the conductor is not pressed. In other words, the through-hole is provided on the main body, not on the connection section.

Figure 6:
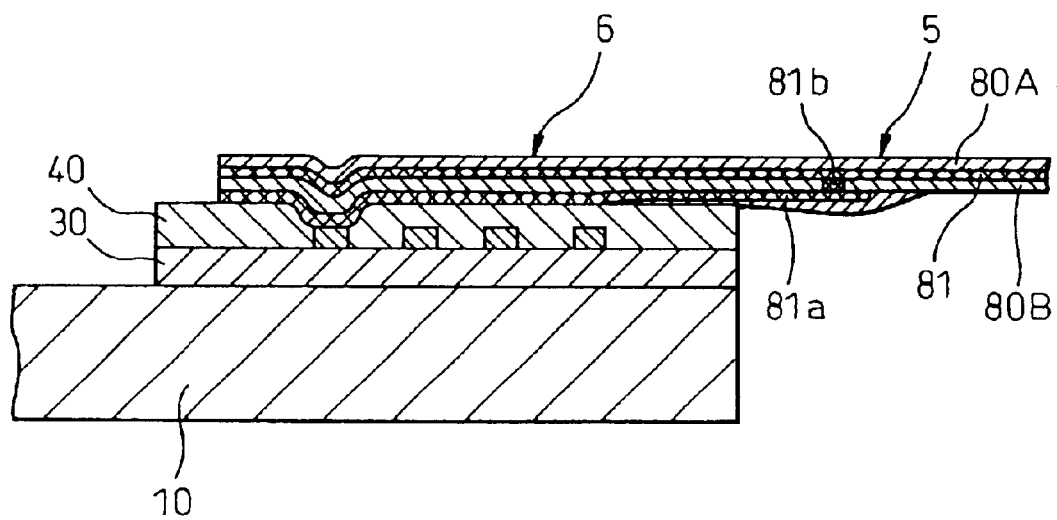
FIG. 6 is a view of a touch panel that explains a second embodiment.

FIG. 6 shows a structure of the second embodiment.

An external harness 4 has its main body 5 formed by basically sandwiching external conductors 81, 82, 83, and 84 between base members 80A and 80B (only 81 is shown in FIG. 6). However, auxiliary external conductors 81a, 82a, 83a, and 84a (only 81a is shown in FIG. 6) are provided on the compressed side near the connection section 6 (the outside of the base member 80B). External conductors 81, 82, 83, and 84 and the auxiliary external conductors 81a, 82a, 83a, and 84a are connected to each other respectively with through-hole conductors 81b, 82b, 83b, and 84b (only 81b is shown in FIG. 6).

Next, a third embodiment of the present invention will be explained. In the third embodiment, in order to fit the external harness 4, not only a thermal compression is applied to connection portions at the manufacturing time like in the first embodiment, but a mechanical pressure is also kept applied to the connection portions.

Figure 7:
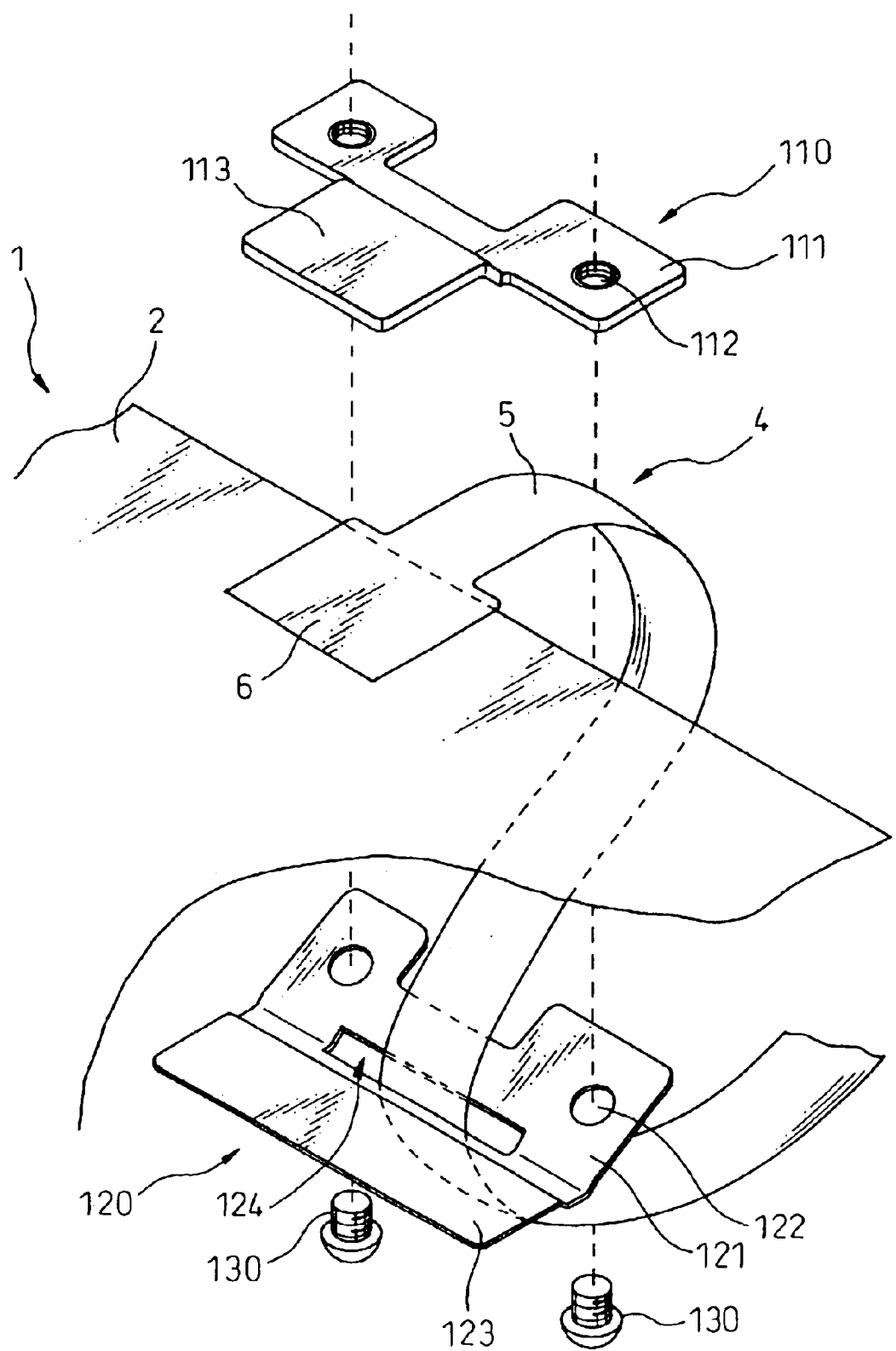
FIG. 7 is a breakdown assembly view of a touch panel that explains a third embodiment.

FIG. 7 shows a breakdown assembly view. A first pressing plate 110 and a second pressing plate 120 are fastened together with screws 130, and a touch panel 1 and a connection section of an external harness 4 are sandwiched between these plates.

The first pressing plate 110 is prepared from a metal or resin plate member. The first pressing plate 110 has a fastening section 111 having screw holes 112, and a pressing section 113 that actually sandwiches the touch panel 1 and the connection section of the external harness 4.

On the other hand, the second pressing plate 120 is prepared from an elastic plate member such as spring steel. The second pressing plate 120 has a fastening section 121 having screw holes 122, and a pressing section 123 that actually sandwiches the touch panel 1 and the connection section of the external harness 4. As shown in FIG. 7, the fastening section 121 and the pressing section 123 form a slightly bent angle in the state before the fastening. Based on this shape, large pressing force is applied when the two pressing plates are fastened together.

A slit 124 is formed at the boundary between the first fastening section 121 and the pressing section 123. The main body 5 of the external harness 4 is drawn out to the outside through this slit.

Figure 8:
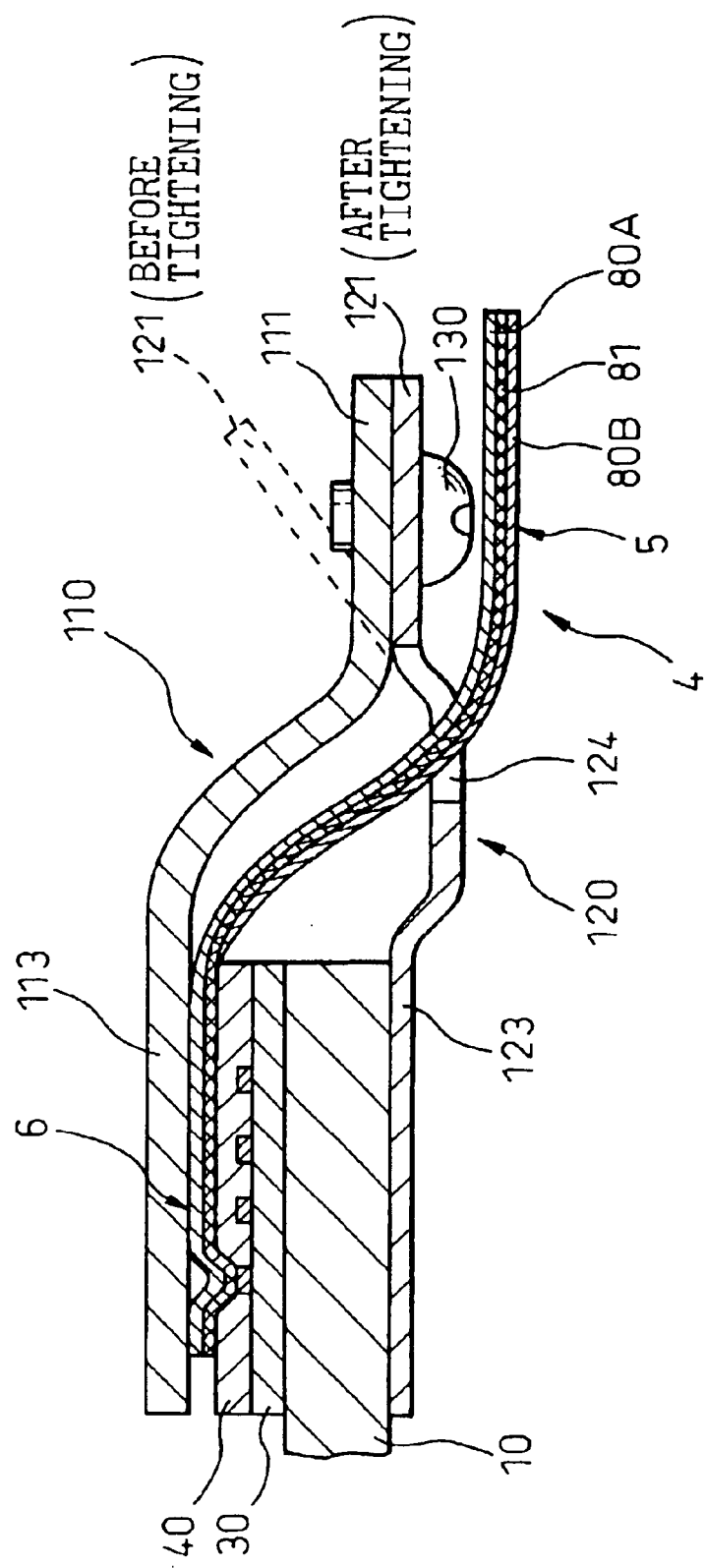
FIG. 8 is a cross-sectional view of a touch panel that shows a state that pressing plates have been fastened in the third embodiment.

FIG. 8 is a cross-sectional view of a touch panel that shows a state that the first pressing plate 110 and the second pressing plate 120 have been fastened with screws 130.

As explained above, according to the present invention, a plurality of guide conductors connected respectively to the electrode cables are disposed in parallel while being mutually insulated, on one surface of one plate of the touch panel to extend along one side in the vicinity of this side. The external harness is formed in a flat cable that has the plurality of external conductors laid out in parallel with each other and integrally coated with an insulating resin at top and bottom surfaces, on the same plane. The plurality of external conductors are superimposed with the plurality of guide conductors of the touch panel so that they cross each other. The insulating material on mutually opposite sides of portions at which the plurality of guide conductors of the touch panel and the corresponding external conductors cross each other is removed in advance. At the cross portions, the touch panel and one side of the external harness are pressed against the other side while being heated, thereby to connect the plurality of guide conductors of the touch panel with the corresponding external conductors. Therefore, there is an effect that it is possible to fit the external conductor to optional positions on the guide conductors that are connected to the electrode cables of the touch panel. Consequently, it is possible to flexibly manage requests for changing fitting positions of the external conductors.

Further, according to the present invention, the external harness has its external conductors coated with an insulating resin at top and bottom surfaces to the front end, at an end portion of a connection with the touch panel. The external harness is connected to auxiliary external conductors provided at the outside of the insulating resin with through-hole conductors that pass through through-holes provided at the outside of a touch panel area. The auxiliary external conductors are extended to the touch panel area and connected to guide conductors that are connected to the electrode cables of the touch panel. Therefore, there is an effect that the through-hole conductors are not damaged even when the external harness is pressed against the touch panel.

Further, according to the present invention, the connection structure has a fastening unit that mutually fastens the touch panel and the external harness. The fastening unit includes a first plate member and a second plate member that is fixed to the first plate member with screws at the outside of a connection area. One of the plate members is a spring member of which the center is projected to the outside. The touch panel and the external harness are fastened together with elastic force of the spring member. Therefore, there is an effect that the fastening unit fastens the touch panel and the external harness together, and the external harness is not easily removed.

What is claimed is:

1. A connection structure for connecting a plurality of electrode cables of a touch panel to a plurality of corresponding external conductors of an external harness, the touch panel being provided such that two plates, with at least one plate having flexibility, are disposed by sandwiching spacers between them, electrode cables being disposed along two mutually opposite sides of one plate, and electrode cables being disposed along two mutually opposite sides of the other plate that are approximately orthogonal with the two sides, wherein a plurality of guide conductors connected respectively to the electrode cables are disposed in parallel while being mutually insulated, on one surface of one plate of the touch panel to extend along one side in the vicinity of this side, the external harness is formed in a flat cable that has the plurality of external conductors laid out in parallel with each other on a flat plane and integrally coated with an insulating resin at top and bottom surfaces, the plurality of external conductors are superimposed with the plurality of guide conductors of the touch panel so that they cross each other, the insulating material on mutually opposite sides of portions at which the plurality of guide conductors of the touch panel and the corresponding external conductors cross each other is removed in advance, and at the cross portions, the touch panel and one side of the external harness are pressed against the other side while being heated, thereby to connect the plurality of guide conductors of the touch panel with the corresponding external conductors.

2. The touch panel according to claim 1, wherein
the plurality of external conductors have their coating on the surface opposing to the touch panel in the area superimposed to the touch panel removed for a predetermined length including respective cross portions.

3. The touch panel according to claim 1, wherein
the touch panel and one side of the external harness are pressed against the other side while being heated, thereby to connect the touch panel with the external harness, at points other than the cross points at which the plurality of guide conductors of the touch panel cross the corresponding external conductors of the external harness.

4. The touch panel according to claim 3, wherein
the touch panel is connected with the external harness at an outside position in a width direction of the external harness from the cross points at which the plurality of guide conductors of the touch panel cross the corresponding external conductors of the external harness.

5. The touch panel according to claim 3, wherein
the touch panel is connected with the external harness at a position close to the touch panel from the cross points at which the plurality of guide conductors of the touch panel cross the corresponding external conductors of the external harness.

6. A connection structure for connecting a plurality of electrode cables of a touch panel to a plurality of corresponding external conductors of an external harness, the touch panel being provided such that two plates, with at least one plate having flexibility, are disposed by sandwiching spacers between them, electrode cables being disposed along two mutually opposite sides of one plate, and electrode cables being disposed along two mutually opposite sides of the other plate that are approximately orthogonal with the two sides, wherein the external harness has its external conductors coated with an insulating resin at top and bottom surfaces to the front end, at an end portion of a connection with the touch panel, and is connected to auxiliary external conductors provided at the outside of the insulating resin with through-hole conductors that pass through through-holes provided at the outside of a touch panel area, and the auxiliary external conductors are extended to the touch panel area and connected to guide conductors that are connected to the electrode cables of the touch panel.

7. A connection structure for connecting a plurality of electrode cables of a touch panel to a plurality of corresponding external conductors of an external harness, the touch panel being provided such that two plates, with at least one plate having flexibility, are disposed by sandwiching spacers between them, electrode cables being disposed along two mutually opposite sides of one plate, and electrode cables being disposed along two mutually opposite sides of the other plate that are approximately orthogonal with the two sides, wherein the connection structure has a fastening unit that mutually fastens the touch panel and the external harness, and the fastening unit includes a first plate member and a second plate member that is fixed to the first plate member with screws at the outside of a connection area, with one of the plate members being a spring member of which the center is projected to the outside, thereby to fasten the touch panel and the external harness together with the elastic force of the spring member.

* * * * *